(12) United States Patent
Abdolkhani et al.

(10) Patent No.: US 10,958,104 B2
(45) Date of Patent: Mar. 23, 2021

(54) INVERTER FOR INDUCTIVE POWER TRANSMITTER

(71) Applicant: Apple Inc., Cupertino, CA (US)

(72) Inventors: Ali Abdolkhani, Auckland (NZ); Aiguo Hu, Auckland (NZ)

(73) Assignee: Apple Inc., Cupertino, CA (US)

( * ) Notice: Subject to any disclaimer, the term of this patent is extended or adjusted under 35 U.S.C. 154(b) by 551 days.

(21) Appl. No.: 15/518,000

(22) PCT Filed: Oct. 8, 2015

(86) PCT No.: PCT/NZ2015/050172
§ 371 (c)(1),
(2) Date: Apr. 10, 2017

(87) PCT Pub. No.: WO2016/056925
PCT Pub. Date: Apr. 14, 2016

(65) Prior Publication Data
US 2017/0310164 A1    Oct. 26, 2017

Related U.S. Application Data

(60) Provisional application No. 62/061,287, filed on Oct. 8, 2014, provisional application No. 62/194,413, filed on Jul. 20, 2015.

(51) Int. Cl.
| | | |
|---|---|---|
| *H01F 38/14* | (2006.01) | |
| *H02J 17/00* | (2006.01) | |
| *H02J 50/12* | (2016.01) | |
| *H02J 7/02* | (2016.01) | |
| *H02J 50/40* | (2016.01) | |

(52) U.S. Cl.
CPC ............. *H02J 50/12* (2016.02); *H02J 7/025* (2013.01); *H02J 50/40* (2016.02)

(58) Field of Classification Search
CPC ............. H02J 7/025; H02J 50/40; H02J 50/12
See application file for complete search history.

(56) References Cited

U.S. PATENT DOCUMENTS

| | | |
|---|---|---|
| 4,276,588 A | 6/1981 | McLyman et al. |
| 2006/0267523 A1 | 11/2006 | Seelig et al. |

(Continued)

FOREIGN PATENT DOCUMENTS

| | | |
|---|---|---|
| EP | 2690739 | 1/2014 |
| GB | 2505719 A | 3/2014 |

(Continued)

OTHER PUBLICATIONS

International Written Opinion for International Application No. PCT/NZ2015/050172 dated Dec. 16, 2015 (8 pages).

(Continued)

*Primary Examiner* — Carlos Amaya
*Assistant Examiner* — Esayas G Yeshaw
(74) *Attorney, Agent, or Firm* — Blank Rome LLP

(57) ABSTRACT

An inductive power transmitter comprising a plurality of autonomous resonant inverters, wherein each inverter outputs a voltage to a respective transmitter coil/coils for inductive power transfer; and a magnetic coupling structure between the respective transmitter coils, wherein the magnetic coupling structure is configured to determine a phase shift between the output voltage of each inverter.

20 Claims, 14 Drawing Sheets

(56) References Cited

U.S. PATENT DOCUMENTS

| | | | |
|---|---|---|---|
| 2011/0127951 A1* | 6/2011 | Walley | H02J 50/10 320/108 |
| 2011/0254379 A1 | 10/2011 | Madawala | |
| 2012/0032632 A1* | 2/2012 | Soar | H01F 38/14 320/108 |
| 2012/0319479 A1 | 12/2012 | Covic et al. | |
| 2013/0051083 A1 | 2/2013 | Zhao | |
| 2013/0127358 A1* | 5/2013 | Yao | H05B 45/50 315/201 |
| 2013/0147273 A1* | 6/2013 | van der lee | H02J 4/00 307/31 |
| 2013/0257311 A1* | 10/2013 | Tran | H05B 45/00 315/279 |
| 2014/0035379 A1* | 2/2014 | Stevens | H02J 7/0013 307/104 |
| 2014/0091640 A1 | 4/2014 | Scholz et al. | |
| 2014/0146587 A1* | 5/2014 | Voronin | H02M 7/537 363/131 |
| 2014/0375260 A1* | 12/2014 | Janssen | H01F 38/14 320/108 |
| 2014/0376269 A1* | 12/2014 | Johnson | H02M 7/537 363/17 |
| 2015/0001956 A1 | 1/2015 | Saen et al. | |
| 2015/0224883 A1* | 8/2015 | Ichikawa | B60L 50/40 320/108 |
| 2017/0133880 A1* | 5/2017 | Wakisaka | B60L 53/122 |
| 2017/0207656 A1* | 7/2017 | Boys | H02M 5/458 |
| 2018/0062430 A1* | 3/2018 | Matsumoto | H02M 3/33592 |

FOREIGN PATENT DOCUMENTS

| | | |
|---|---|---|
| JP | 2005147016 A | 6/2005 |
| WO | 2012039635 | 3/2012 |
| WO | 2014/035260 | 3/2014 |
| WO | 2014042681 A2 | 3/2014 |
| WO | WO-2014035260 A1 * | 3/2014 ............. H02J 50/40 |
| WO | 2015/080598 | 6/2015 |

OTHER PUBLICATIONS

International Search Report for International Application No. PCT/NZ2015/050172 dated Dec. 16, 2015 (3 pages).
Abdolkhani. "Contactless Slipring Systems for Wireless Power Transfer in Rotary Applications." Thesis from the University of Auckland, Mar. 2014 (260 pages).
Gao "Traveling Magnetic Field for Homogeneous Wireless Power Transmission." IEEE Transactions on Power Delivery vol. 22, No. 1 (Jan. 2007), pp. 507-514.
Abdolkhani et al. "Autonomous Poly-phase Current-fed Push-pull Resonant Converter Based on Ring Coupled Oscillators." IEEE Journal of Emerging and Selected Topics in Power Electronics, vol. 3, Issue 1, (Jun. 2015) 18 pages.
Raval et al. "3D inductive power trasnfer system." Wireless Power Transfer, FirstView Article, Apr. 2014, pp. 1-14.
R. Bosshard et al., "Control method for Inductive Power Transfer with high partial-load efficiency and resonance tracking", 2014, International Power Electronics Conference (IPEC—Hiroshima 2014, ECCE Asia), May 1, 2014 (May 1, 2014), pp. 2167-2174, XP055311747, DOI: 10.1109/IPEC.2014.6869889, ISBN: 978-1-4799-2705-0.
European Search Report for EP Application No. 15848571.4 dated Oct. 12, 2017 (14 pages).
Abdolkhani et al. "Through-Hole Contactless Slipring System Based on Rotating Magnetic Field for Rotary Applications." IEEE vol. 50, No. 6, Nov. 2014, pp. 3644-3655.

* cited by examiner (a) Resonant voltages (full-wave)

(b) Gate waveforms following the resonant voltages (half-wave)

(a) Resonant voltages (half-wave)

(b) Resonant currents (full-wave)

(c) Gate waveforms of the phases (a) ZVS operation of phase-1

(b) ZVS operation of phase-2

(c) ZVS operation of phase-3

INVERTER FOR INDUCTIVE POWER TRANSMITTER

This application is a National Stage Application of PCT/NZ2015/050172, filed 8 Oct. 2015, which claims benefit of U.S. Provisional Ser. No. 62/061,287, filed 8 Oct. 2014 and U.S. Provisional Ser. No. 62/194,413, filed 20 Jul. 2015 and which applications are incorporated herein by reference. To the extent appropriate, a claim of priority is made to each of the above disclosed applications.

FIELD OF THE INVENTION

This invention relates generally to an inductive power transfer system.

BACKGROUND OF THE INVENTION

Electrical converters are found in many different types of electrical systems. Generally speaking, a converter converts a supply of a first type to an output of a second type. Such conversion can include DC-DC, AC-AC and DC-AC electrical conversions. In some configurations a converter may have any number of DC and AC 'parts', for example a DC-DC converter might incorporate an AC-AC converter stage in the form of a transformer.

The term 'inverter' may sometimes be used to describe a DC-AC converter specifically. Again, such inverters may include other conversion stages, or an inverter may be a stage in the context of a more general converter. Therefore, the term inverter should be interpreted to encompass DC-AC converters, either in isolation or in the context of a more general converter. For the sake of clarity, the remainder of this specification will refer to a DC-AC converter using the term 'inverter' without excluding the possibility that the term 'converter' might be a suitable alternative in some situations.

One example of the use of inverters is in inductive power transfer (IPT) systems. IPT systems will typically include an inductive power transmitter and an inductive power receiver. The inductive power transmitter includes a transmitting coil or coils, which are driven by a suitable transmitting circuit to generate an alternating magnetic field. The alternating magnetic field will induce a current in a receiving coil or coils of the inductive power receiver. The received power may then be used to charge a battery, or power a device or some other load associated with the inductive power receiver. Further, the transmitting coil and/or the receiving coil may be connected to a resonant capacitor to create a resonant circuit. A resonant circuit may increase power throughput and efficiency at the corresponding resonant frequency.

Ordinarily, the transmitting coil or coils are supplied with a suitable AC current generated by an inverter. The inverter may be configured or controlled to generate an AC current of a desired waveform, frequency, phase and amplitude. In some instances, it may be desirable for the frequency of the inverter to match the resonant frequency of the resonant transmitting coil and/or the resonant receiving coil.

One known type of inverter used in IPT systems is a push-pull inverter. Push-pull inverters typically rely on an arrangement of switches that, by means of co-ordinated switching, cause the current to flow in alternating directions through an associated transmitting coil or coils. By controlling the switches, the output AC current supplied to the transmitting coils can be controlled. 4

A problem associated with push-pull inverters is that, in order to reduce switching losses and EMI interference, the switches should be controlled to be switched on and off when the voltage across the switch is zero i.e. zero voltage switching (ZVS). Implementing ZVS often requires additional detection circuitry to detect the zero crossing and control circuitry to control the switches accordingly. This additional circuitry adds complexity and expense to the converter. Further, some detection and control circuitry may not be able to meet the demands of high frequency inverters.

A further problem associated with known inverters is that in a polyphase or multiple phase configuration, dedicated phase shift circuitry is needed to maintain the phase between each of the single phase inverters. Again, this adds complexity and cost to the converter.

Accordingly, the invention provides a polyphase inverter for an inductive power transmitter that does not rely on complex circuitry to simultaneously achieve ZVS and phase shift control, or at least provides the public with a useful choice. The invention further provides suitable magnetic coupling structures for transmitter and receiver used in such a polyphase inductive power transfer system.

SUMMARY OF THE INVENTION

According to one exemplary embodiment there is provided an inductive power transmitter comprising a plurality of single phase autonomous inverters wherein each respective resonant inductor is magnetically coupled to at least one other resonant inductor.

According to a further embodiment there is provided an inductive power transmitter comprising:
  a plurality of autonomous resonant inverters, wherein each inverter outputs a voltage to a respective transmitter coil for inductive power transfer; and
  a magnetic coupling structure between the respective transmitter coils, wherein the magnetic coupling structure is configured to determine a phase shift between the output voltage of each inverter.

According to a further embodiment there is provided an inductive power transmitter comprising:
  three or more transmitter coils; and
  an inverter with an output having at least three phases, each phase configured to connect to one or more of the coils,
  wherein the coils and the phases are configured to provide a time and/or spatially varying magnetic field in a charging volume.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any documents in this specification does not constitute an admission that those documents are prior art or form part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
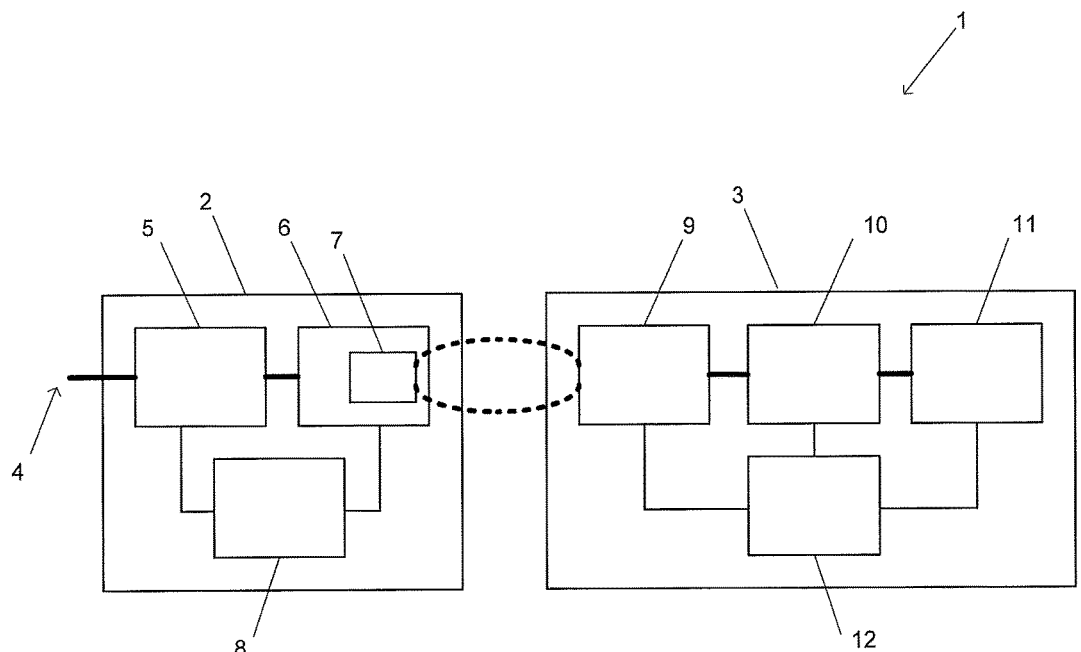
FIG. 1 is a block diagram of an inductive power transfer system.

FIG. 1 shows a representation of an inductive power transfer (IPT) system 1. The IPT system includes an inductive power transmitter 2 and an inductive power receiver 3. The inductive power transmitter is connected to an appropriate power supply 4 (such as mains power). The inductive power transmitter may include an AC-DC converter 5 that is connected to an inverter 6. The inverter supplies a transmitting coil or coils 7 with an AC current so that the transmitting coil or coils generate an alternating magnetic field. In some configurations, the transmitting coils may also be considered to be separate from the inverter. The transmitting coil or coils may be connected to capacitors (not shown) either in parallel or series to create a resonant circuit.

FIG. 1 also shows a controller 8 within the inductive power transmitter 2. The controller may be connected to each part of the inductive power transmitter. The controller may be adapted to receive inputs from each part of the inductive power transmitter and produce outputs that control the operation of each part. Those skilled in the art will appreciate that the controller may be implemented as a single unit or separate units. Those skilled in the art will appreciate that the controller may be adapted to control various aspects of the inductive power transmitter depending on its capabilities, including for example: power flow, tuning, selectively energising transmitting (transmitter) coils, inductive power receiver detection and/or communications.

The inductive power receiver 3 includes a receiving coil or coils 9 that is connected to receiving circuitry 10 that in turn supplies power to a load 11. When the inductive power transmitter 2 and inductive power receiver are suitably coupled, the alternating magnetic field generated by the transmitting coil or coils 7 induces an alternating current in the receiving coil or coils. The receiving circuitry is adapted to convert the induced current into a form that is appropriate for the load. The receiving coil or coils may be connected to capacitors (not shown) either in parallel or series to create a resonant circuit. In some inductive power receivers, the receiver may include a controller 12 which may, for example, controlling the tuning of the receiving coil or coils, or the power supplied to the load by the receiving circuitry.

In certain IPT applications it may be desirable to provide a polyphase inverter, usually with each inverter supplying or outputting a voltage to a separate and respective transmitting coil. For example, in rotating applications, it may be desirable to use multiple phase shifted coils to produce a rotating magnetic field. In a contactless slipring system, this can be used to transfer power to the rotor without the power loss and reliability problems associated with contacting sliprings. Other applications may require a rotating magnetic field, such as an induction motor, or may require phase control over parallel connected inverters, such as Electric Vehicle drive systems.

In such cases it may be necessary or desirable to control the phase shift between the magnetic fields generated by each coil. In a contactless slipring system it may be desirable to ensure an even phase shift between each phase. For a 3 phase system, the spacing between phases should be $2\pi/3$ radians or 120°.

In previous poly-phase IPT systems, the mutual interaction between the primary phases is considered a problem, and the mutual inductance is normally cancelled by using phase rotation or flux compensation. This is because if the mutual interaction between the phases exists, it will cause power exchange between phases, which may cause disruption or failure of the power supply.

The inventors have discovered to the contrary that a poly-phase autonomous inverter may in fact harness a certain degree of mutual magnetic coupling between the phases for controlling the phase shift between the respective phases.

Magnetic coupling or a magnetic structure, in this case, means any configuration or arrangement designed at least partially for the purpose of controlling the phase shift between the inverters. For example, depending on the phase shift requirements, this may involve use of a common high magnetic permeability material on which each transmitting coil is mounted.

Use of magnetic coupling to control phase shift may be applicable to any poly-phase inverter, where there is a need to control the phase shift between each phase. In such case, inverter control for each individual phase may be autonomous, although semi-autonomous or non-autonomous may be used depending on the application.

Autonomous inverters may include various topologies, for example push-pull, flyback, full bridge, etc. Autonomous switching is normally provided by closed feedback loop control, so that the switching frequency follows drifts in the resonant frequency to maintain ZVS. However depending on the application, an inverter controlled for partial ZVS or hard switching may also be used.

If three substantially identical autonomous single-phase converters are magnetically coupled symmetrically via their resonant inductances, they form a ring-coupled oscillator. An example is a push-push oscillator. More generally N-push oscillator topologies comprise identical oscillators which are symmetrically coupled as a ring to generate high frequency components. A triple-push oscillator design is a specific case of a ring-coupled oscillator for high frequency generation. Alternatively the triple-push oscillators can be physically coupled either in a ring or star via additional circuitry. However magnetic coupling via their resonant inductances avoids any direct electrical contact or additional circuitry.

Figure 2:
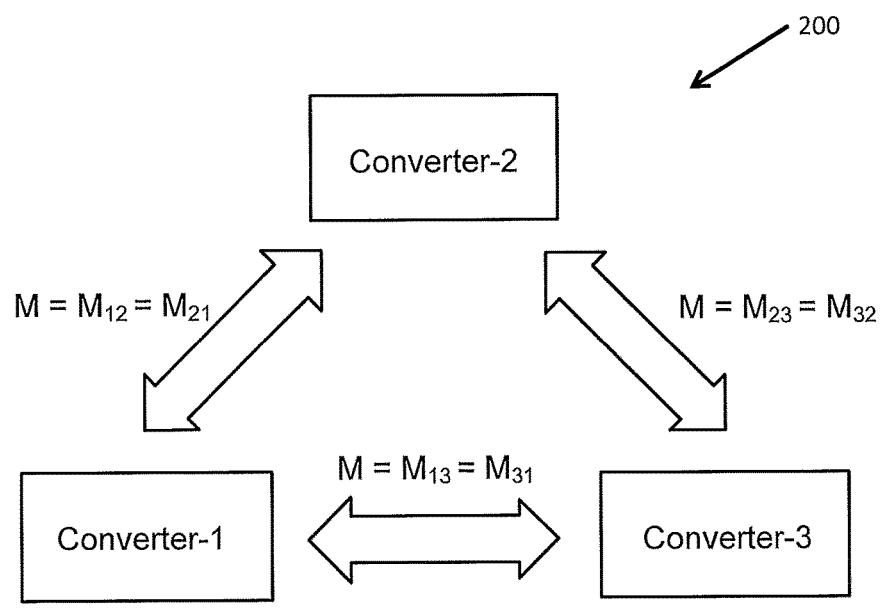
FIG. 2 is a block diagram of the poly-phase inverter showing the symmetrical magnetic coupling between phases.
Figure 3:
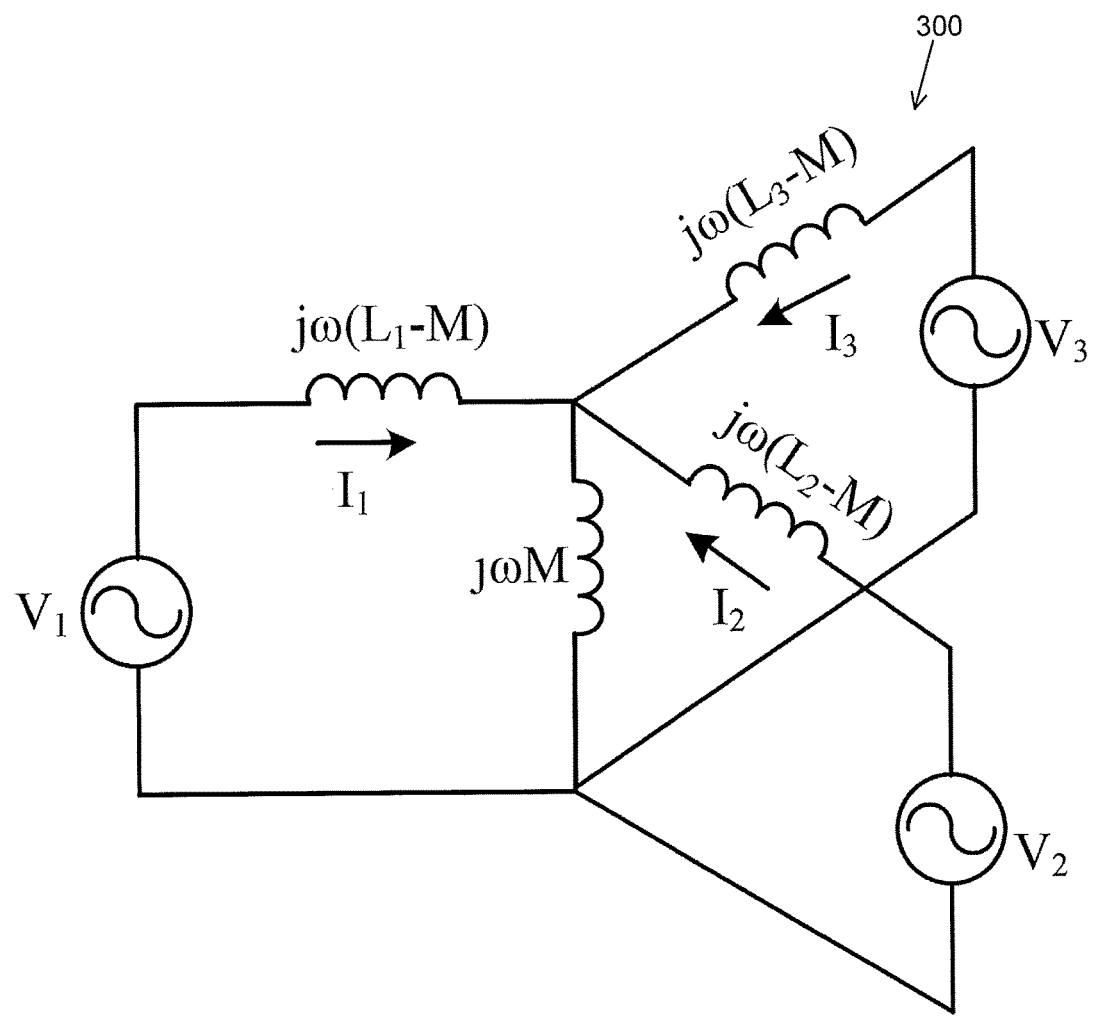
FIG. 3 is an equivalent circuit of the poly-phase inverter.

For the purposes of the simulation and experiment discussed below the inverter resonant inductors were symmetrically coupled in a ring topology 200 with approximately equal mutual inductances, $M_{12} \approx M_{13} \approx M_{23}$, as shown in FIG. 2. However different topologies may be used according to the application. If the magnetic structure is substantially symmetrical with approximately equal resonant inductors ($L_1 \approx L_2 \approx L_3 \approx L$) and approximately equal mutual inductances ($M_{12} \approx M_{13} \approx M_{23} \approx M$); then, based on the T-equivalent circuit of the two coupled coils, the coupled resonant inductances of the proposed poly-phase inverter can be modelled in the equivalent circuit 300 shown in FIG. 3.

The mutual inductances should be approximately equal between all phases, e.g., within at least 15% of each other. Otherwise mutual inductance balancing techniques can be used as described below.

With a ring coupled poly-phase topology and high order switching operation, the inventors discovered that instead of complete dynamic analysis, the system can be more easily characterised with a set of defined operating modes. The presence of the different modes depends on the number of inverters that form the ring and the coupling strength between them. A simplified mathematical formulation can be determined using a multi-port Z-parameter representation. The analysis of the Z-parameter matrix equation for a 3 phase topology gives one even mode and two odd modes for steady state operation. The most commonly possible existing modes in a ring of three coupled inverters are listed in Table 1, where $\phi_1$, $\phi_2$, $\phi_3$, $A_1$, $A_2$ and $A_3$ are the output phases and amplitudes of the three oscillators. The amplitude and phase relationships in Table 1 correspond to the relationships at the fundamental component of the oscillator elements. In Table 1, mode $M_1$ is the in-phase mode, meaning all the oscillators are in phase. $M_2$ is the travelling wave mode where the oscillators present a phase shift of $2\pi/N=120°$ at the fundamental component, which is the desired mode of the balanced operation. In $M_3$ two of the oscillators are in phase and the third one is in the opposite direction.

TABLE 1

POSSIBLE OPERATING MODES IN
A RING OSCILLATOR (N = 3)

| Mode of operation | Oscillation phase (relative to $\omega_0 t$) | | | Oscillation amplitude | | |
|---|---|---|---|---|---|---|
| | $\phi_1$ | $\phi_2$ | $\phi_3$ | $A_1$ | $A_2$ | $A_3$ |
| Mode 1 | $\phi$ | $\phi$ | $\phi$ | $A_{M1}$ | $A_{M1}$ | $A_{M1}$ |
| Mode 2 | $\phi$ | $\phi + 120$ | $\phi + 240$ | $A_{M2}$ | $A_{M2}$ | $A_{M2}$ |
| Mode 3 | $\phi$ | $\phi$ | $\phi + 180$ | $A_{M3}$ | $A_{M3}$ | $A_{M3}$ |

The inventors investigated the relationship of different modes depending on the magnetic coupling ($k_{12}=k_{13}=k_{23}=k$) strength between the autonomously oscillating phases of the inverter. A steady state simulation study was carried out in LTspice IV using the circuit parameters shown in Table 2 for the circuit topology discussed below in relation to FIG. 9. An equivalent reflected load resistance (R) from the inductive power receiver is included in each primary phase for the purpose of the simulation to represent the impact of the receiver.

TABLE 2

SYSTEM SPECIFICATIONS

| Parameter | Value |
|---|---|
| $L_1 = L_2 = L_3$ (μH) | 100 |
| $C_1 = C_2 = C_3$ (nF) | 47 |
| $L_{dc1} \sim L_{dc6}$ (mH) | 1 |
| R (Ω) | 3 |
| $V_{dc}$ (V) | 12 |
| $R_1 \sim R_6$ (kΩ) | 1 |
| $C_{S1} \sim C_{S6}$ (nF) | 0.5 |
| N-channel MOSFET (IRFP240) | 200 V/20 A/0.18 Ω |

Figure 4:
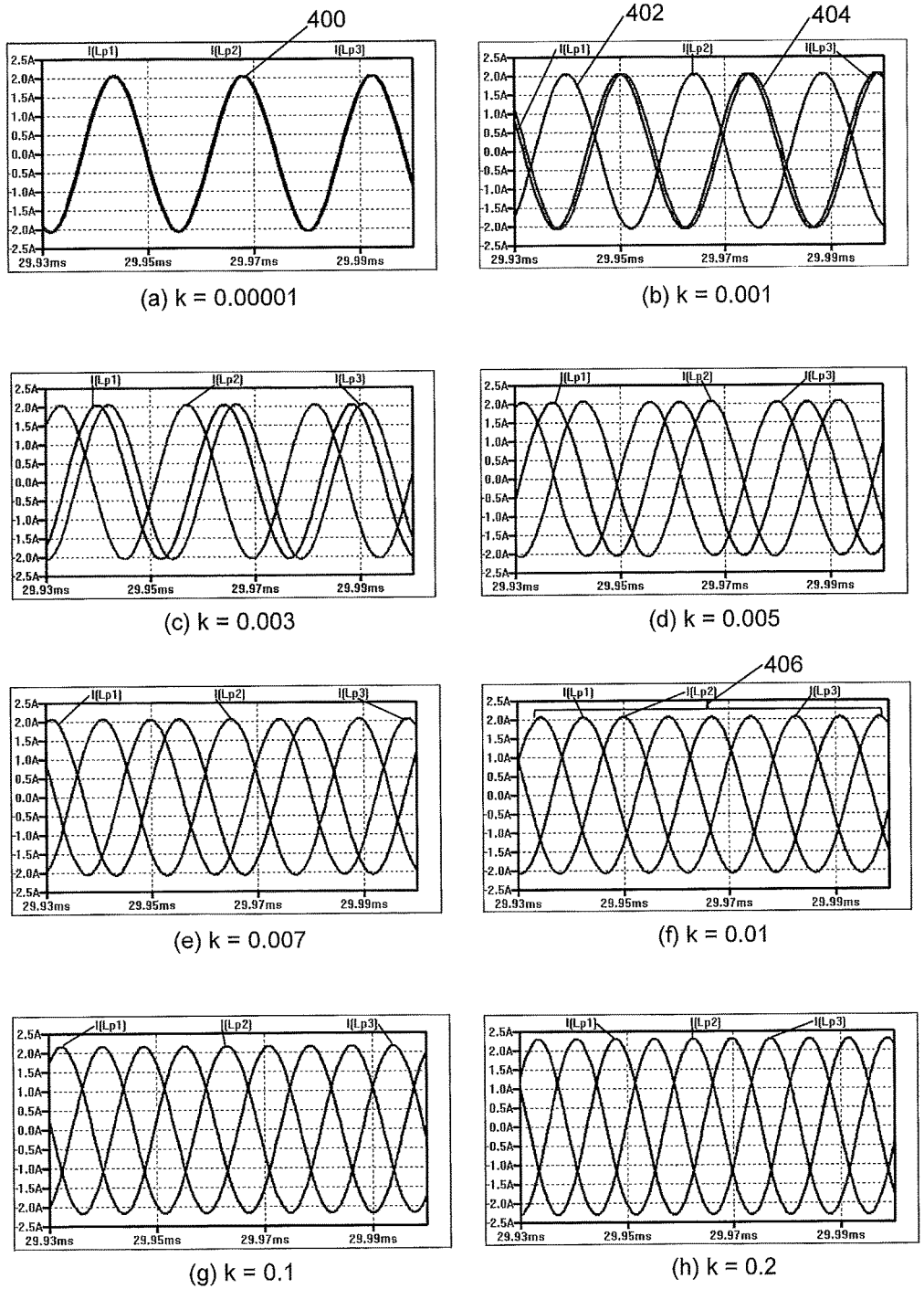
FIGS. 4(a)-(h) are graphs of the resonant currents for various mutual couplings.

FIG. 4 shows the resonant currents of the converter for various levels of symmetrical magnetic coupling between the phases. As it can be seen from FIG. 4(*a*), for weak coupling about 0.0001 between the phases, the converter operates in in-phase mode 400 as the stable mode of operation. For a coupling of 0.001, the converter tends to have two of the phases in-phase 404 and the other phase 402 is about 180° out of phase (Mode 3) as illustrated in FIG. 4(*b*). As the coupling between the phases increase, the phases tend to push each other within the coupling loop and share an equal phase shift. This can be observed from FIGS. 4(*c, d, e, f*) the converter stabilizes on travelling wave mode 406 of operation at a coupling of 0.01 (FIG. 4(*f*)). After reaching travelling wave mode, strengthening the coupling does not affect the mode of operation.

Thus in applications where it is desirable to establish and sustain travelling wave mode operation the magnetic coupling between the phases should be sufficiently strong (typically $k_{12}=k_{13}=k_{23}=$at least about 0.01, or preferably about 0.2~0.3). However increasing the coupling too high may reduce the inductive transfer efficiency. For example the maximum may be designated as about 0.3, or according to the application requirements.

Figure 5:
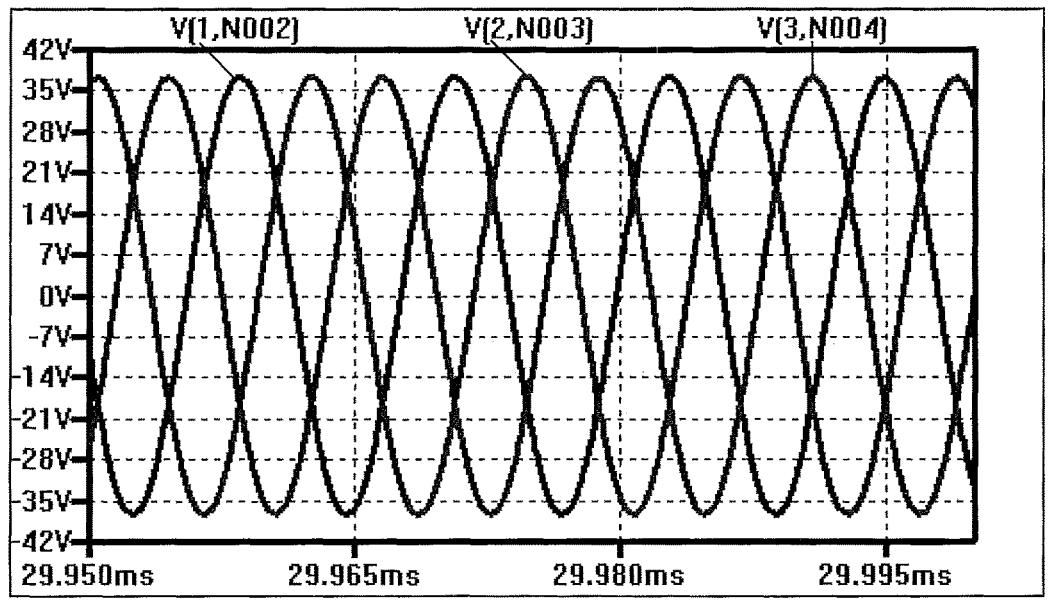
FIGS. 5(a)-(b) are graphs of simulation results for k=0.2.
Figure 5:
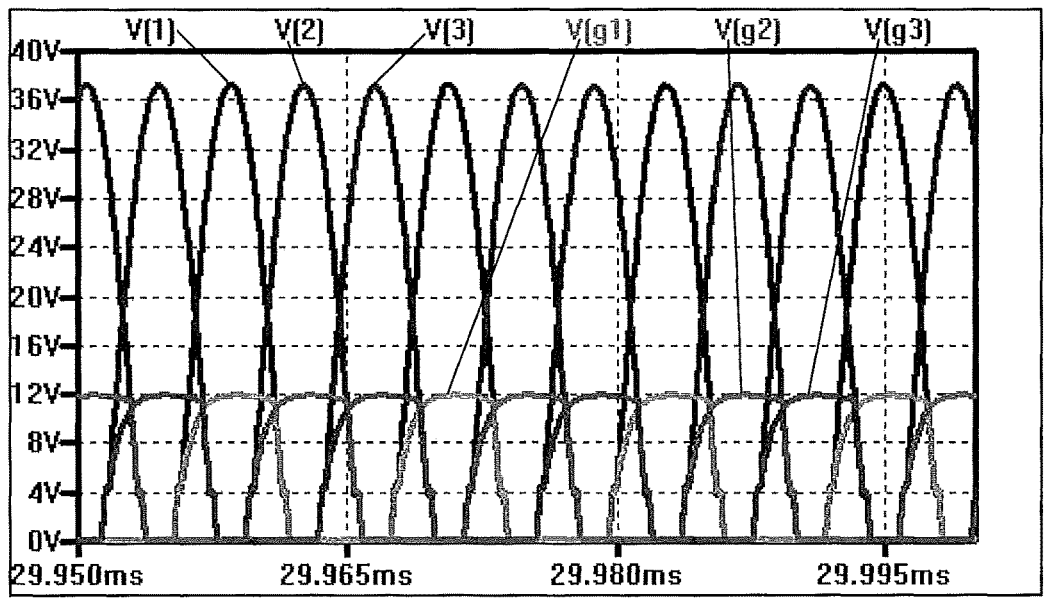

FIG. 5 shows the resonant voltages (full-wave) and the gate waveforms over one side of the resonant voltage for the case with k=0.2. As it can be seen they are good sinusoids with accurate 120° phase shift and ZVS operation for all of the phases.

Figure 6:
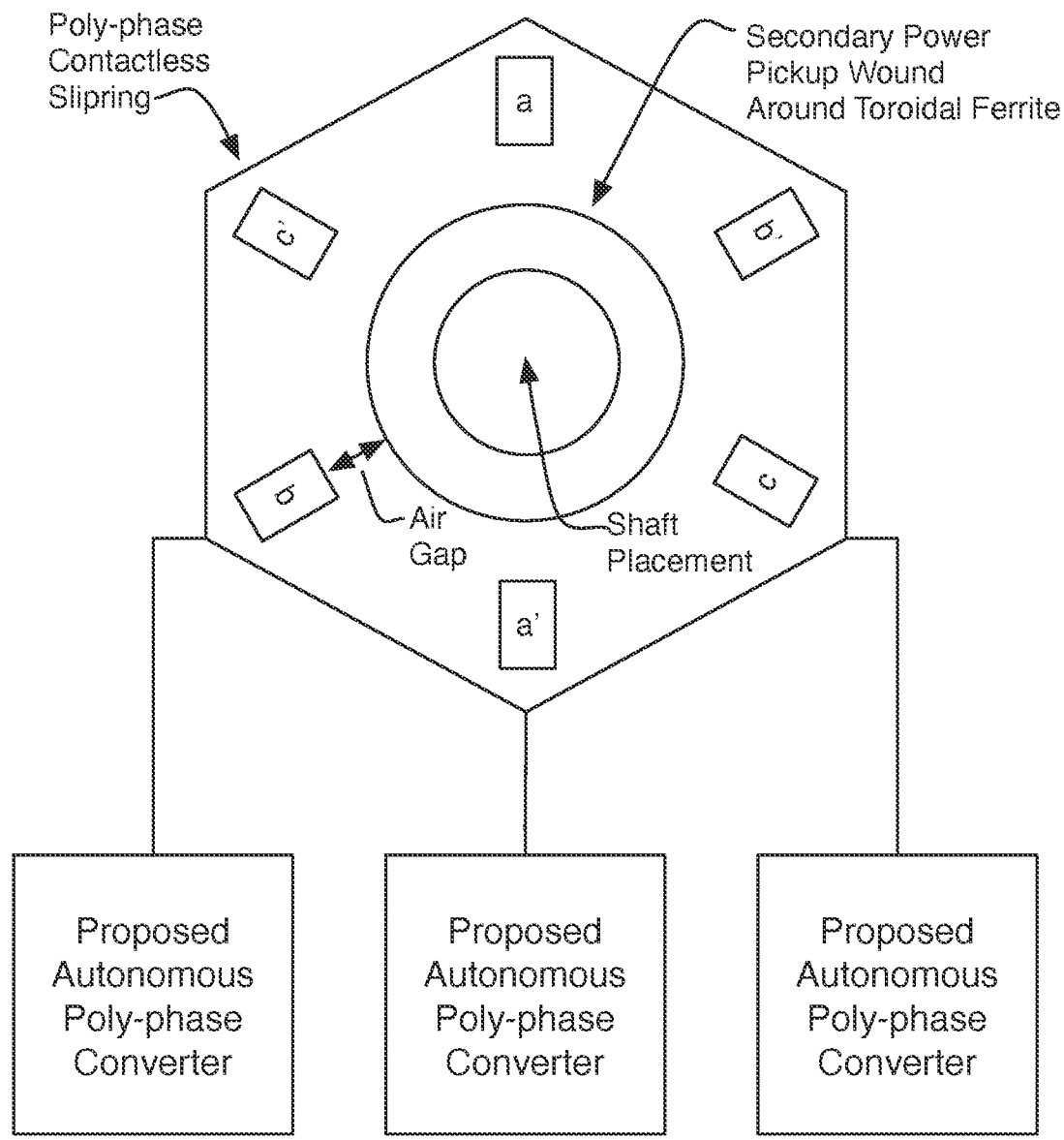
FIG. 6 is an image of a practical setup of the proposed converter used to drive a poly-phase IPT system.

A prototype of the proposed converter operating at a frequency of about 73.5 kHz driving a poly-phase contactless slipring system is shown in FIG. 6. The poly-phase contactless slipring is an alternative system to mechanical slipring for power transfer to an electrical load mounted on a rotating shaft wirelessly. As the structure is substantially symmetrical, the magnetic coupling coefficients between the phases are approximately equal ($k_{12} \approx k_{13} \approx k_{23}$) and measured about 0.25. This level of mutual coupling is sufficient to sustain poly-phase autonomous operation with travelling wave mode and ZVS.

It was observed that the autonomous poly-phase inverter can start up automatically by just turning on the main switch of a regulated DC power supply without employing any start-up gate control.

Figure 7:
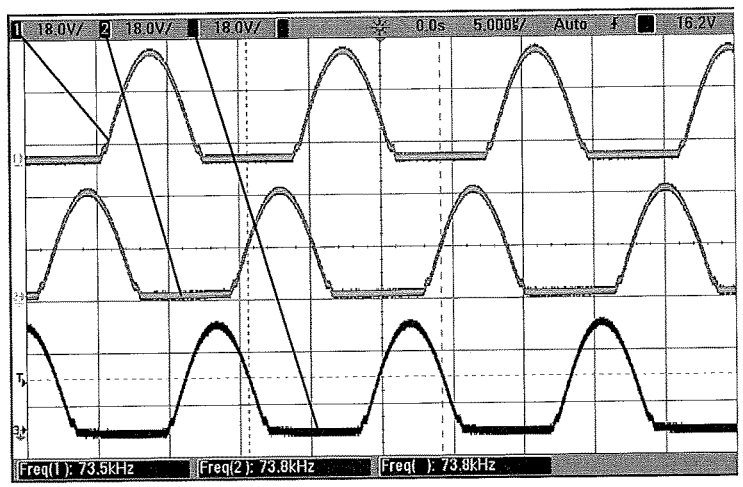
FIGS. 7(a)-(c) are graphs of steady-state measured waveforms of the resonant tank in FIG. 12 at about 73.5 kHz.
Figure 7:
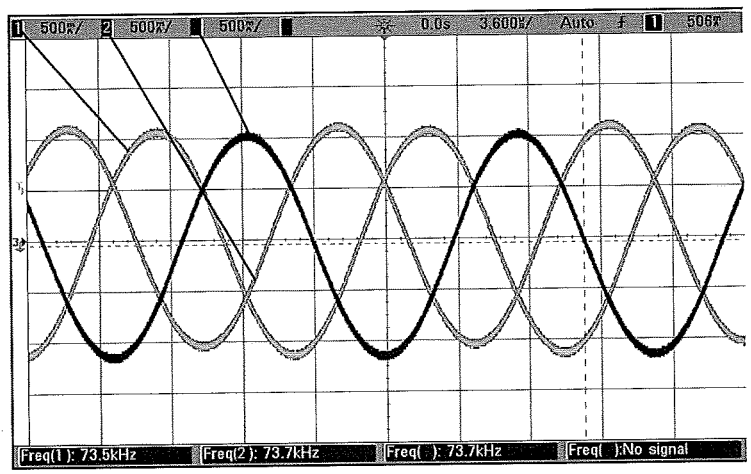
Figure 7:
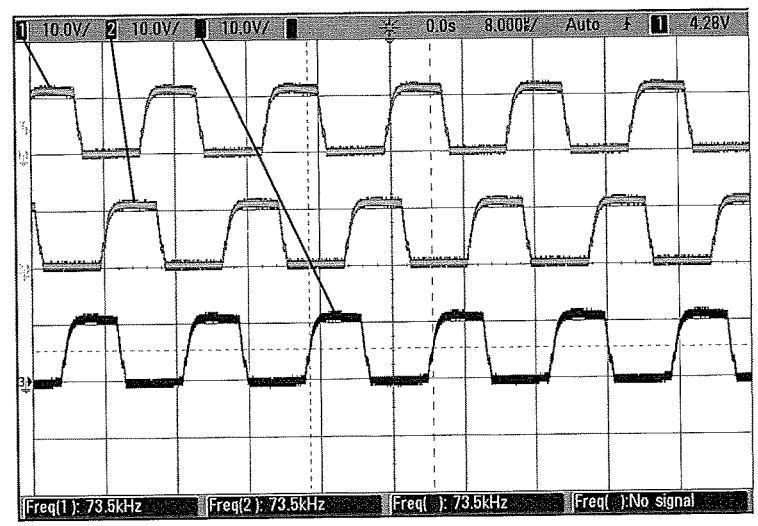

At steady-state the inverter maintains a self-regulating phase delay scheme with ZVS operation for all phases without any controller. FIG. 7 shows the waveforms of the resonant voltage across the resonant capacitors (half-wave), the resonant currents flowing through the resonant inductors (full-wave), and the gate waveforms of all phases at about 73.5 kHz operating resonant frequency. The waveforms are sinusoidal with a very good quality, full resonance, and exact 120° phase delays.

Figure 8:
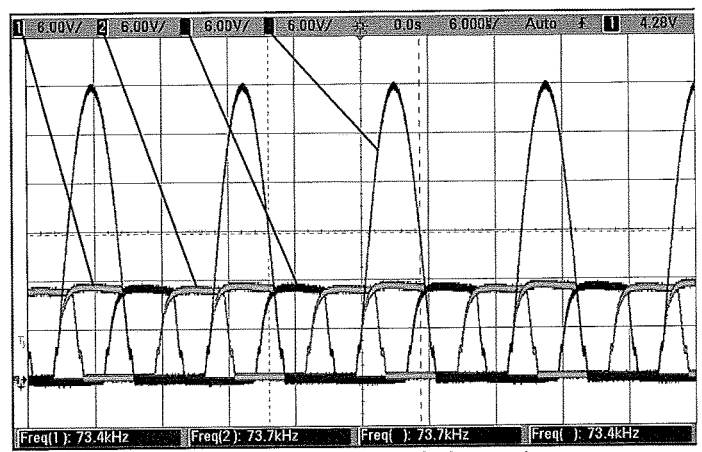
FIG. 8(a)-(c) are graphs of ZVS operation of all phases.
Figure 8:
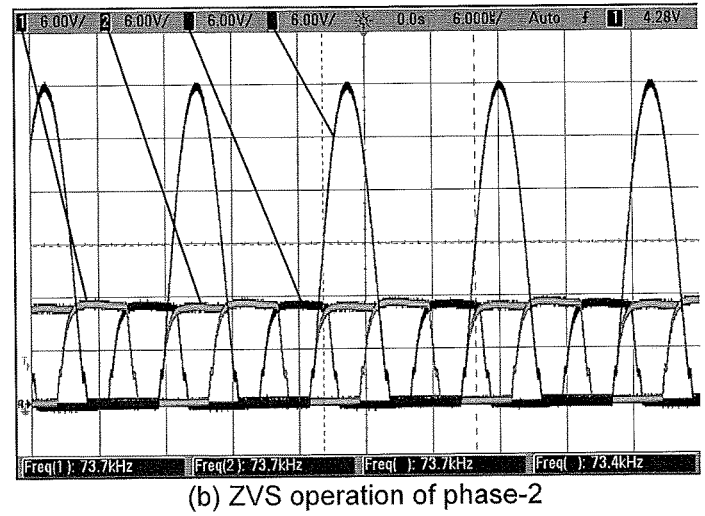
Figure 8:

FIG. 8 shows the measured waveforms of the switching voltage of each phase over one switch (a half wave) and the gate drive signal of the other switch. It can be seen that precise ZVS is practically achieved for all phases at 73.5 kHz making the proposed converter a good candidate for poly-phase IPT systems with a moving magnetic field requirements.

Figure 9:
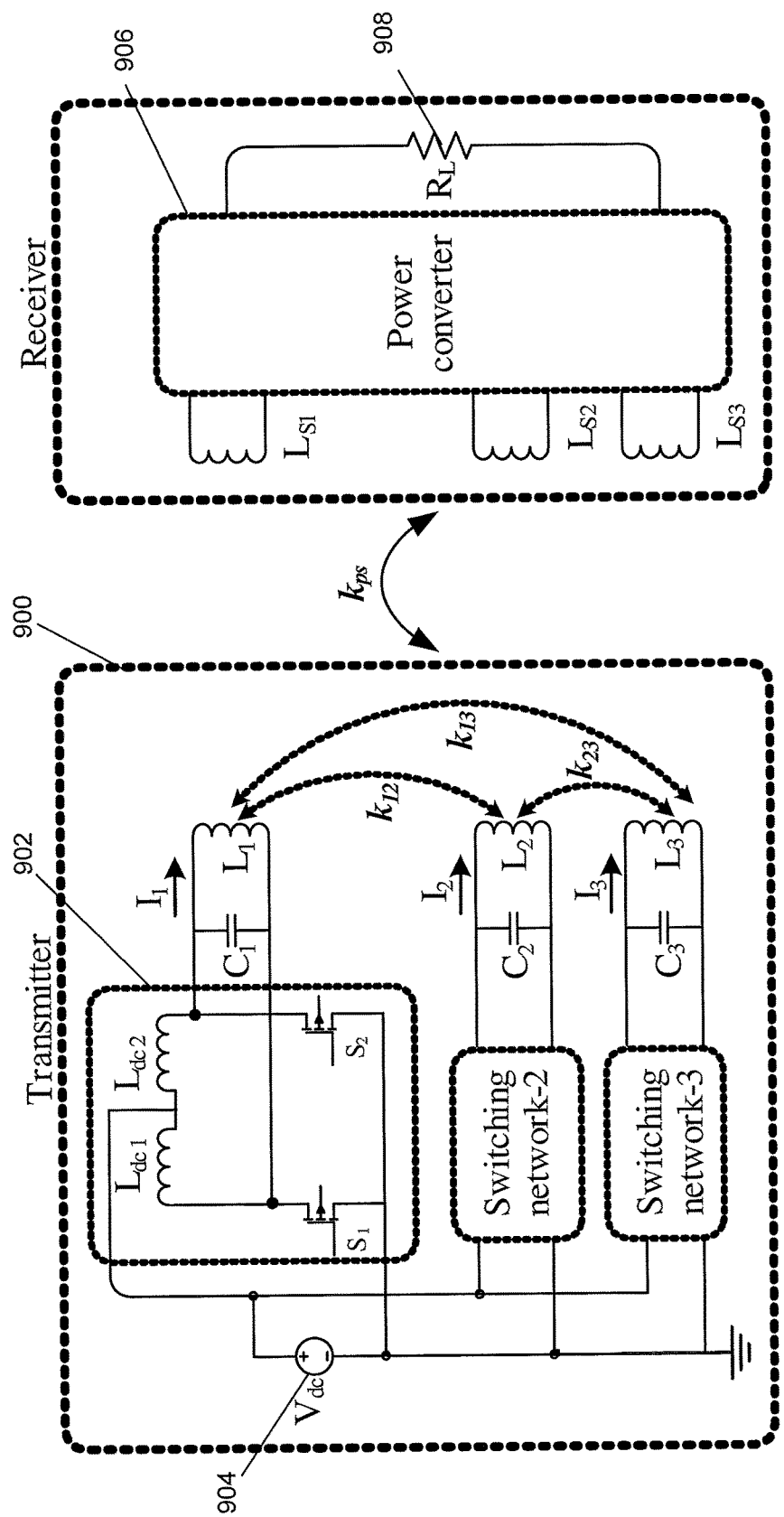
FIG. 9 is a block diagram of a poly-phase inverter topology according to an embodiment.

An example autonomous poly-phase inverter 900 is shown in FIG. 9. Three identical single-phase current-fed push-pull inverters 902 are connected via a common DC power supply 904. The two input inductors of each phase divide the DC current in half under steady state conditions, so that the current flowing into the resonant tank is approximately a square waveform with half the magnitude of the DC current of each phase. In total the inverter is configured as six main switches ($S_1$~$S_6$) with common ground for three-phase power conversion. Each phase comprises of a parallel tuned resonant circuit which consists of a primary inductor or transmitting coil ($L_1$, $L_2$ and $L_3$), a tuning capacitor ($C_1$, $C_2$ and $C_3$). The transmitting coils are magnetically coupled to the receiver coils $L_{S1}$, $L_{S2}$ and $L_{S3}$. A power converter 906 is then used for circuit tuning, rectification and power regulation according to the load requirements.

In FIG. 9 the magnetic coupling with the secondary side is shown as $k_{ps}$ for transferring power to the load 908. At steady-state, when the receiver coils are fully tuned, the reactive impedance reflected back to the transmitter circuit would be very small and can be compensated when designing the transmitter coils. Therefore, for the steady-state conditions of the power supply, it is sufficient to simplify the reflected impedance of the receiver as a pure resistive load.

In this exemplary embodiment, the inverter circuit for each phase may be configured substantially as described in US patent application No. 61/909,709 which is incorporated herein by reference. An example of this single phase circuit is shown in FIG. 10.

Figure 10:
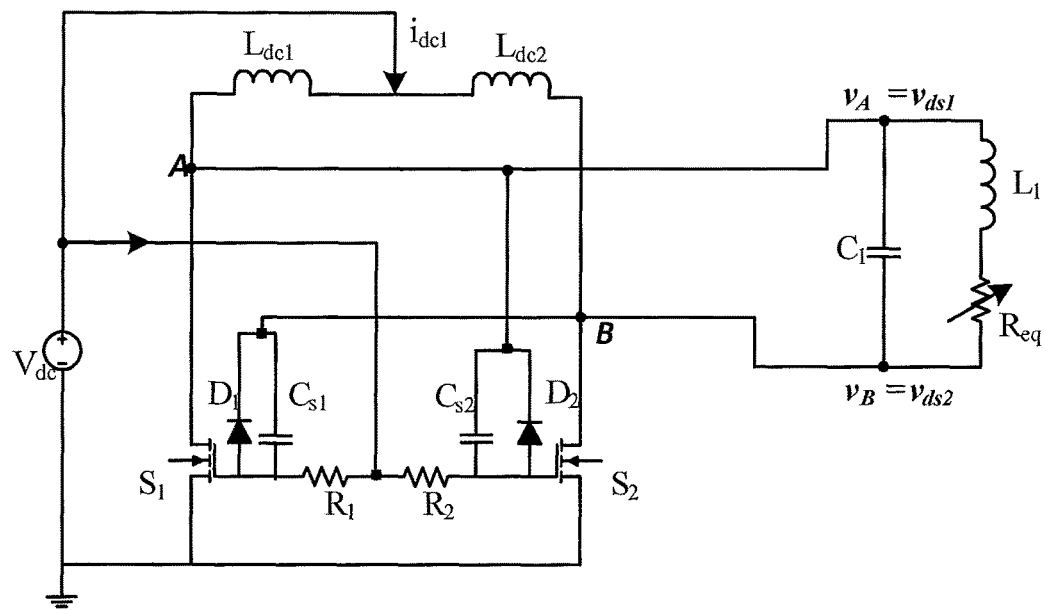
FIG. 10 is a circuit diagram of a single phase inverter from FIG. 9.

Referring to FIG. 10; at steady state, when the voltage at one side of the tank, $v_B$ is high, the voltage at terminal-K (i.e., the cathode terminal) of diode $D_1$ is higher than the voltage at its terminal-A (i.e., the anode terminal) which is equal to the voltage at the gate. During this time, $D_1$ is reverse biased and therefore, the voltage at the gate of $S_1$ stays high ($V_{g1}$). For the second half-cycle when $v_B=0$ V; the voltage at terminal-K of $D_1$ also goes to zero and consequently the voltage at the gate of $S_1$.

Figure 11:
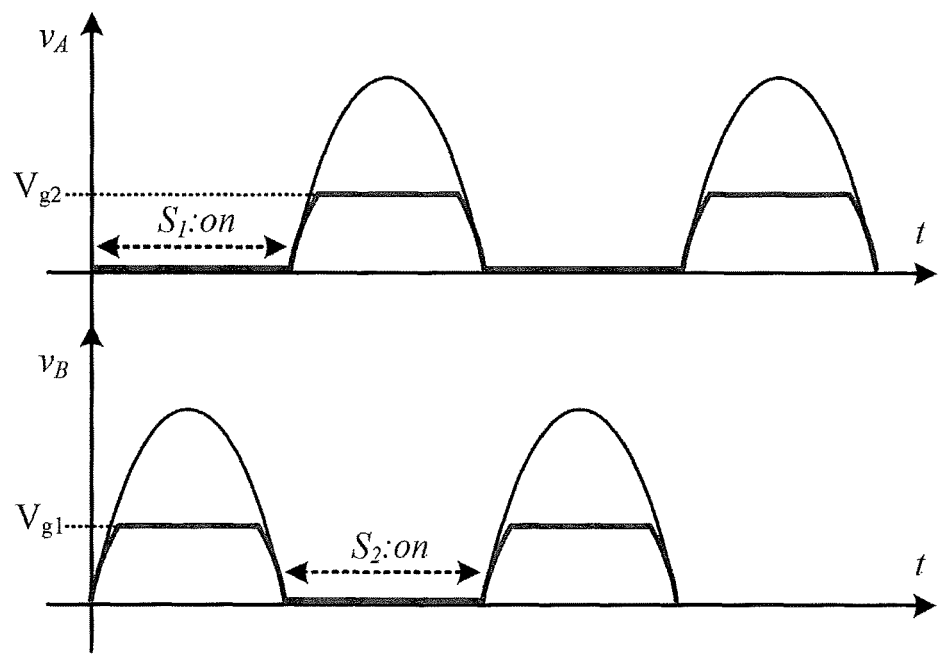
FIG. 11 is a graph of the gate signals, which follow the frequency of the resonant tank.

A similar scenario occurs for $D_2$ with 180° phase shift. It can be observed that depending on the voltage level on both sides of the resonant tank, the voltage at the gates goes high and low following the frequency of the resonant tank as depicted in FIG. 11. The cross-coupled diodes $D_1$ and $D_2$ play an important role in achieving the ZVS operation as summarized in Table I.

TABLE I

LOGIC OF THE ZVS CIRCUIT

| Parameter | First half-cycle | Second half-cycle |
|---|---|---|
| $V_B$ | High | Low |
| $V_A$ | Low | High |
| $D_1$ | OFF | ON |

TABLE I-continued

LOGIC OF THE ZVS CIRCUIT

| Parameter | First half-cycle | Second half-cycle |
|---|---|---|
| $D_2$ | ON | OFF |
| $V_{g1}$ | High | Low |
| $V_{g2}$ | Low | High |

Current limiting resistors ($R_1$ and $R_2$ in the case of the first phase) may prevent the shorting of the DC source regardless of the operating frequency. These resistors in combination with the input capacitances of the switches provide an RC circuit which largely determines the turning 'on' speed. For a given switch with a certain input capacitance $C_{iSS}$, a smaller resistance results in a smaller time constant and a faster charging speed of the input capacitor. But smaller resistances increase the circuit losses, particularly at a high $V_{dc}$. This is mitigated by adding two speedup capacitors ($Cs_1$ and $Cs_2$) in parallel with $D_1$ and $D_2$ as shown in FIG. 10. Due to these capacitors, some charging current will also be supplied by the resonant voltage to make the turning 'on' faster, so the resistances $R_1$ and $R_2$ can be designed to be higher to reduce the circuit losses.

Figure 12:
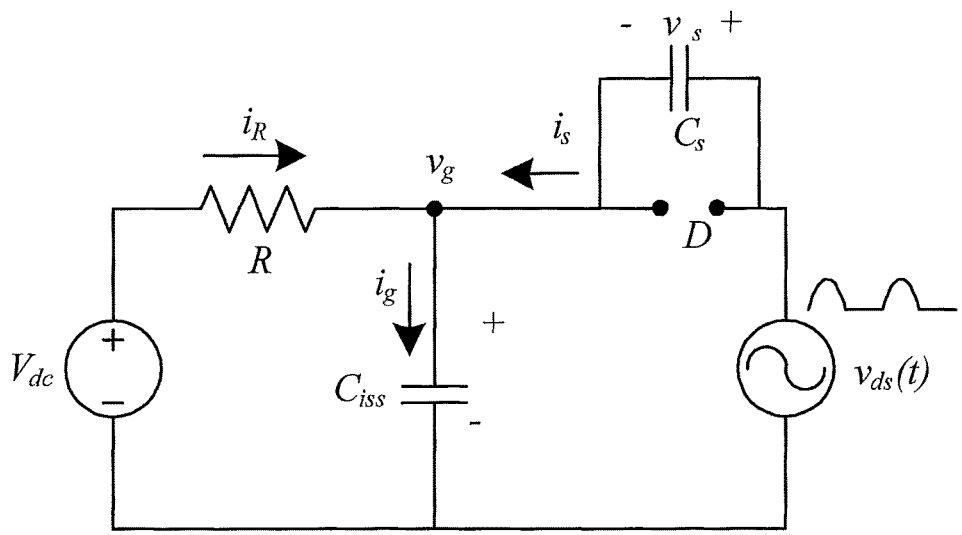
FIG. 12 is an equivalent circuit diagram for the gate drive with a speedup capacitor.

The gate drive circuit dynamics during half a period to turn on the switch can be modelled with two voltage sources as shown in FIG. 12.

From this model, the voltage at the gate $v_g$ is contributed by both the sources $V_{dc}$ and $v_{ds}=\pi V_{dc}$ sin ωt (for a push-pull topology), which can be found by applying the superposition theorem as shown in Equation (1):

$$v_g(t) = [V_{dc}(1 - e^{-t/\tau})] + \left[\left(V_{dc}\frac{\pi C_s R\omega}{(1+\tau^2\omega^2)}\right)(\cos\omega t + \tau\omega\sin\omega t) - \left(V_{dc}\frac{\pi C_s R\omega}{(1+\tau^2\omega^2)}\right)e^{-t/\tau}\right] \quad (1)$$

where $\tau=R(C_{iss}+C_s)$ is the time constant.

At steady state, the zero crossing points exist and detected by the cross connected diodes allowing the switching operation to be employed based on the frequency of the resonant tank. At start-up however, this is not the case as initially there is no energy in the tank circuit and no zero point to be detected. Therefore, an initial energy is essential for starting up the circuit because without any initial energy in the circuit, the resonant voltage would have no zero crossings points, so automatic turning 'on' and 'off' of the switches would not occur.

Figure 13:
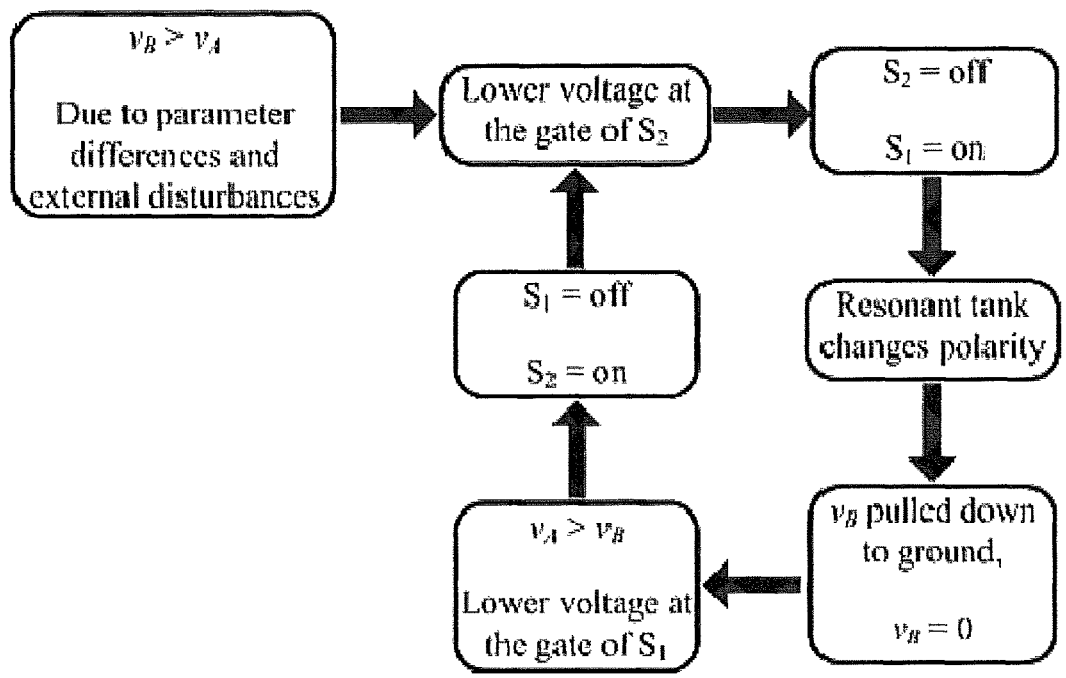
FIG. 13 is a flow diagram of the autonomous regenerative process.

The autonomous converter in FIG. 9 has an initial DC current that is established automatically during the startup transient process without using external gate control as shown in FIG. 13. Initially the two switches $S_1$ and $S_2$ are 'off'. After the DC source is turned on, both the switches tend to turn 'on' by $V_{dc}$ and the gate resistors $R_1$ and $R_2$, so some initial current on the equivalent DC inductance from $L_1$ and $L_2$ would be established. However $S_1$ and $S_2$ cannot stay 'on' all the time because the 'on' state of one switch will short-circuit the gate of the other one and try to turn the other side 'off'.

Practically the two switches would not act at exactly the same speed due to parameter differences, noise and disturbances; the side that turns on faster will win the competition to short circuit the gate voltage of the other side, and further strengthen its 'on' state. For instance, a lower voltage, say $V_A$, due to faster turning 'on' of $S_1$, will provide a lower voltage at the gate of $S_2$, thus $S_2$ will turn off resulting in a higher voltage drop $V_B$, which will further increase the voltage at terminal-K of $D_1$ assuring that $S_1$ remains "on" until the resonant voltage changes the polarity. Consequently, this positive feedback (negative resistance) leads to the bi-stable circuit oscillation and full ZVS operation. In fact the cross-coupled differential MOSFET pair presents a negative resistance to the resonator due to positive feedback. This negative resistance compensates for the equivalent resistance of the resonator and enables sustained oscillation.

The mathematical model governing the initial DC current building up when both switches are 'on' can be approximately expressed as Equation (2):

$$L_{dc} \frac{di_{dc}(t)}{dt} = V_{dc} \qquad (2)$$

Where $L_{dc}$ is the equivalent DC inductance from $L=L_1=L_2$ (for un-coupled inductors) given by Equation (3):

$$L_{dc} = (L_1 \| L_2) = \frac{L}{2} \qquad (3)$$

So for a short time (start-up time $t_0$) $i_{dc}$ increases linearly and it can be expressed by Equation (4):

$$i_{dc}(t) = \frac{V_{dc}}{L_{dc}} \cdot t_0 \qquad (4)$$

Figure 14:
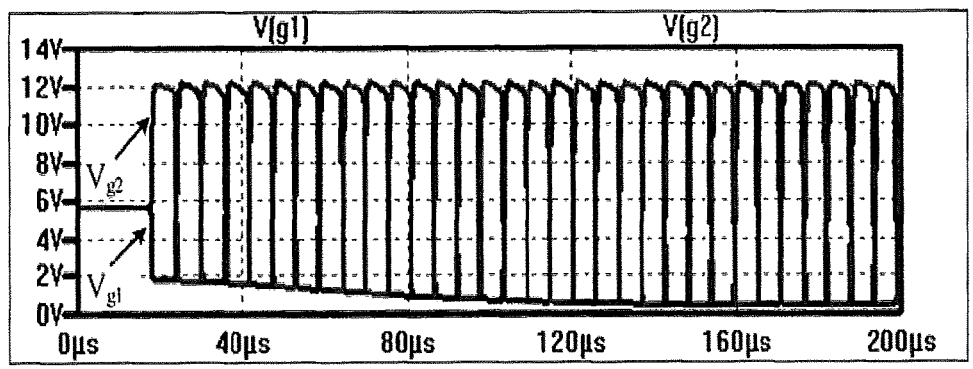
FIG. 14 is a graph of gate waveforms during the start-up for phase-1.

FIG. 14 shows the simulated waveforms of the gate signals during start-up. Before the first zero point there is no energy stored in the tank (until $t_0 \approx 20$ μs). During this period the two gate signals are high (~12 V) keeping both switches "on" to provide the initial DC current $i_{dc}(0)$. Then due to the practical imbalance or noise in the circuit, one of the two diodes (e.g. $D_1$) will turn on, causing one gate voltage ($V_{g1}$) to be low, so $S_1$ will turn "off" while $S_2$ remains "on". Consequently, the resonant voltage magnitude starts to oscillate with ZVS operation.

Figure 15:
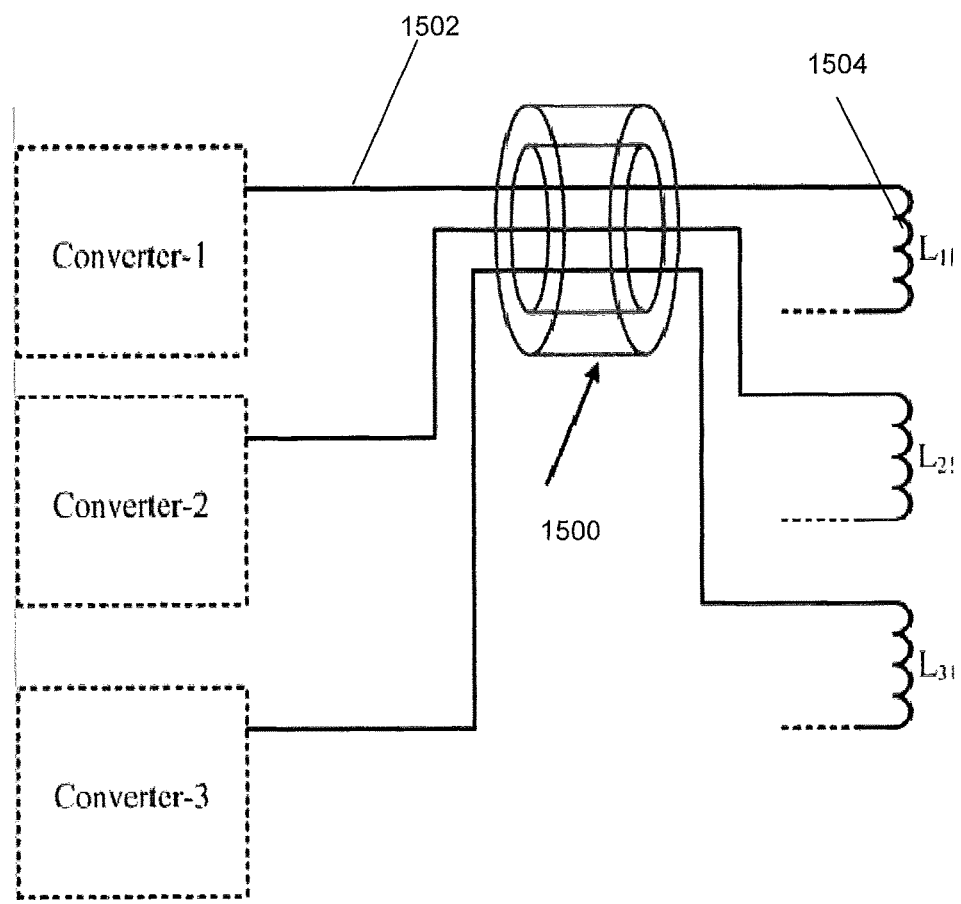
FIG. 15 is a schematic diagram of an asymmetrical coupling structure.

As mentioned above other topologies are equally applicable. In certain applications the magnetic coupling may not be symmetrical, and/or it may be desirable to enable a different mode. FIG. 15 shows that in the case of asymmetrical structures or uncoupled primary coils, symmetrical coupling can be provided with magnetic balancing structure, such as an additional toroidal ferrite 1500 provided around the supply 1502 for selected resonant inductors 1504. For example each phase may have a different number of turns on the ferrite 1500 to adjust the coupling to be symmetrical, and multiple ferrites may be used where only specific combinations of coils need adjustment of coupling.

Note that the level of coupling between the phases should be designed according to the desired mode of operation. For example if travelling wave mode is not desired, e.g., in-phase mode (to provide paralleling of inverters where higher power is required), the magnetic structure can be similarly be modified. For example in Electric Vehicles in order to get the necessary peak power output from the drive system, it may be desirable to connect multiple single phase inverters together in parallel. In such case in order to ensure in phase operation, a very low degree of symmetrical coupling should be provided e.g., $0<k<<0.001$. This might be achieved by the ferrite mentioned above, but with an air gap in the ring to reduce the permeability and thus the coupling level as desired.

Transmitter with Moving Magnetic Field

There is increasing interest in IPT systems 1 in which the inductive power receiver 3 can be freely positioned and freely orientated within a defined charging area or a charging volume and still receive power, regardless of how the inductive power receiver 3 is placed. Often the inductive power transmitter 2 will include raised edges or walls to help guide a user to the charging area and/or to contain transmitting coil or coils 7. As such this type of inductive power transmitter 2 is commonly referred to as a "charging box" transmitter, however it may be made in any shape, and is not limited to a "box" shape.

It may be desirable for the inductive power receiver 3 to be able to receive power when it is at any orientation and position within the charging area of a charging box transmitter. Because with traditional IPT systems 1 the magnetic field within the charging area typically always points in the same direction and varies only in amplitude, it is usually necessary for the inductive power receiver 3 to have three receiving coils 9, with each receiving coil 9 pointed so that it gathers magnetic flux coming from a different direction. In this way, the inductive power receiver 3, regardless of orientation or position, will always be able to receive power from at least one of its receiving coils 9 when the inductive power receiver 9 is within the charging area. In order to increase the amount of power that an inductive power receiver 3 will receive under worst-case coupling conditions when used with a charging box transmitter, it is generally beneficial to point each of the three of receiving coil 9 in crosswise directions from each other, so that they are all mutually perpendicular and can gather magnetic flux coming from any direction equally well.

In a traditional charging box transmitter, the magnetic field generated by the transmitting coil or coils 7 at the location of the inductive power receiver 3 varies in amplitude but not direction, or varies only very coarsely in direction, for example cycling between two perpendicular directions for several cycles at a time in any particular direction. In these cases, even if an inductive power receiver 3 has three mutually perpendicular receiving coils 9 and is capable of gathering magnetic flux from any of three dimensions, the magnetic field available for the inductive power receiver 3 points in only a single direction at one time. This means that only one of the three receiving coils 9 may be transferring maximum power at a given time.

In contrast, it is possible to create a moving magnetic field vector in a charging box transmitter, for example by using a polyphase inverter 6 and polyphase transmitting coils 7. Because a moving magnetic field vector points through a range of different directions in a single period of the operating frequency, it is possible for a magnetic field comprised of these vectors to excite two perpendicular receiver coils 9 simultaneously. Compared with a magnetic field which points in only a single direction throughout a period of the operating frequency, this rotating magnetic field can cause the power output from an inductive power receiver 3 with three mutually perpendicular receiving coils 9 to double or at least significantly increase. Alternately, one of the three mutually perpendicular receiving coils 9 can be eliminated, so that the inductive power receiver 3 needs only two receiving coils 9 in order to receive power anywhere and at any orientation within the charging area. This may be useful for miniaturized applications where space is limited, such as wirelessly rechargeable battery cells. The movement of the magnetic field may be rotary movement or maybe other field movement such as linear, axial, or dynamically varied.

Figure 16:
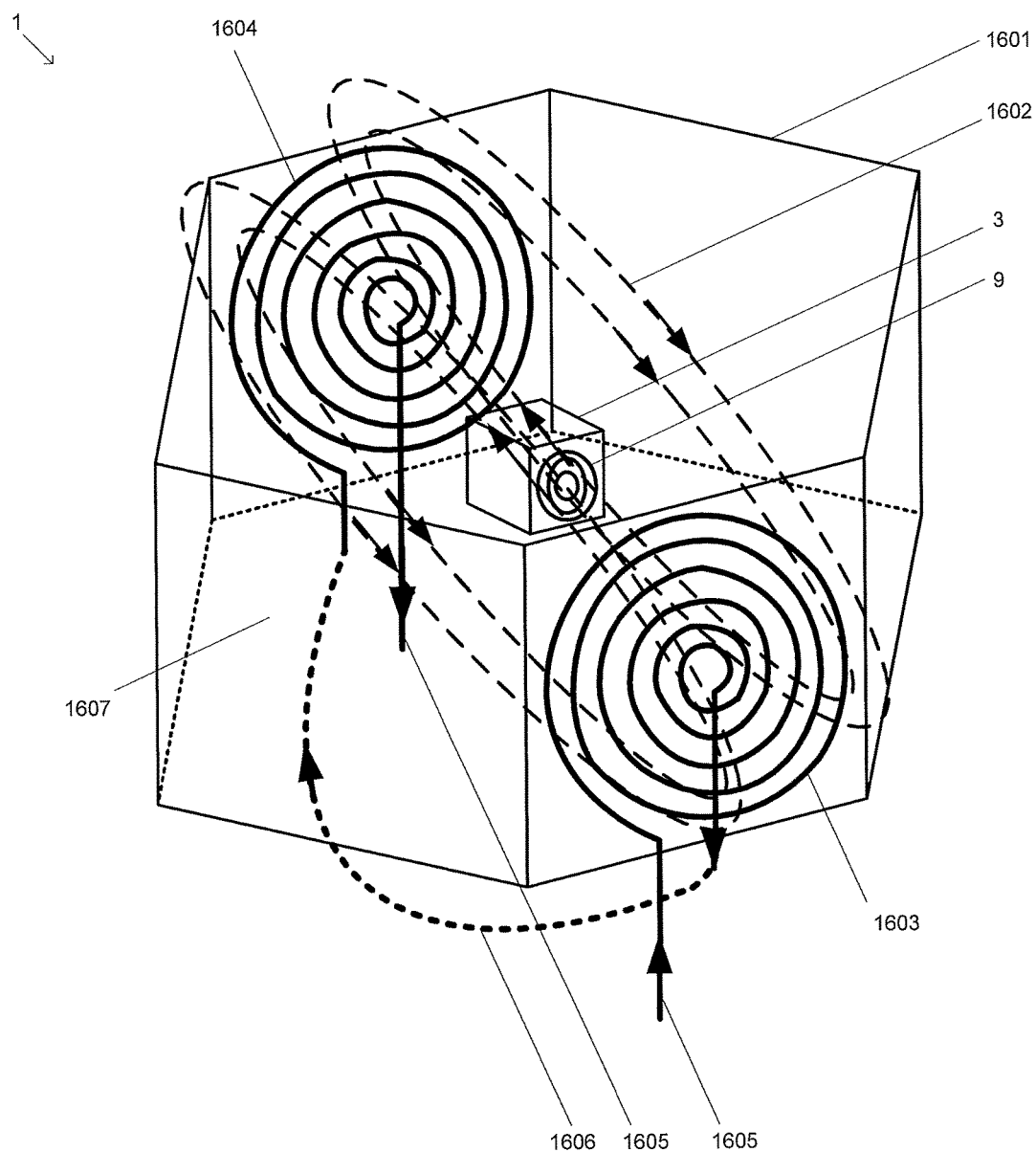
FIG. 16 is a diagram of example magnetic flux lines in a charging box transmitter.

FIG. 16 is a simplified example of an IPT system 1 wherein the inductive power transmitter 2 is in the form of a charging box transmitter 1601 and has a smoothly rotating magnetic field, depicted at a particular instant in time. Though this example is of a three phase system with a phase-1, a phase-2 and a phase-3, only phase-1 is shown for simplicity. The magnetic field created by the inductive power transmitter 2 is shown by magnetic flux lines 1602. An inductive power receiver 3 is inside the charging box transmitter 1601, and has a receiving coil 9. Several of transmitting coil 7 can be arranged around the perimeter of the charging box 1601. Coil-a 1603 and coil-a' 1604 of phase-1 are positioned in the walls of the charging box transmitter 1601. Phase-a inverter connections 1605 are visible, although the inverter 6 is not shown. Coil-a 1603 and coil-a' 1604 are connected together by a phase-1 coil interconnection 1606. The area or volume of space in which the inductive power receiver 3 can charge wirelessly is called the charging area 1607.

When a number of transmitting coils 7 are energized so that there is a phase delay between the magnetic fields created by one transmitting coil 7 and the next, a rotating magnetic field can be established in the charging area 1607. A smoothly rotating magnetic field can allow a higher rate of power transfer, over larger air gaps, with fewer unpowered or weakly powered areas and/or with lower EMI than is possible with magnetic fields which do not smoothly rotate.

Figure 17:
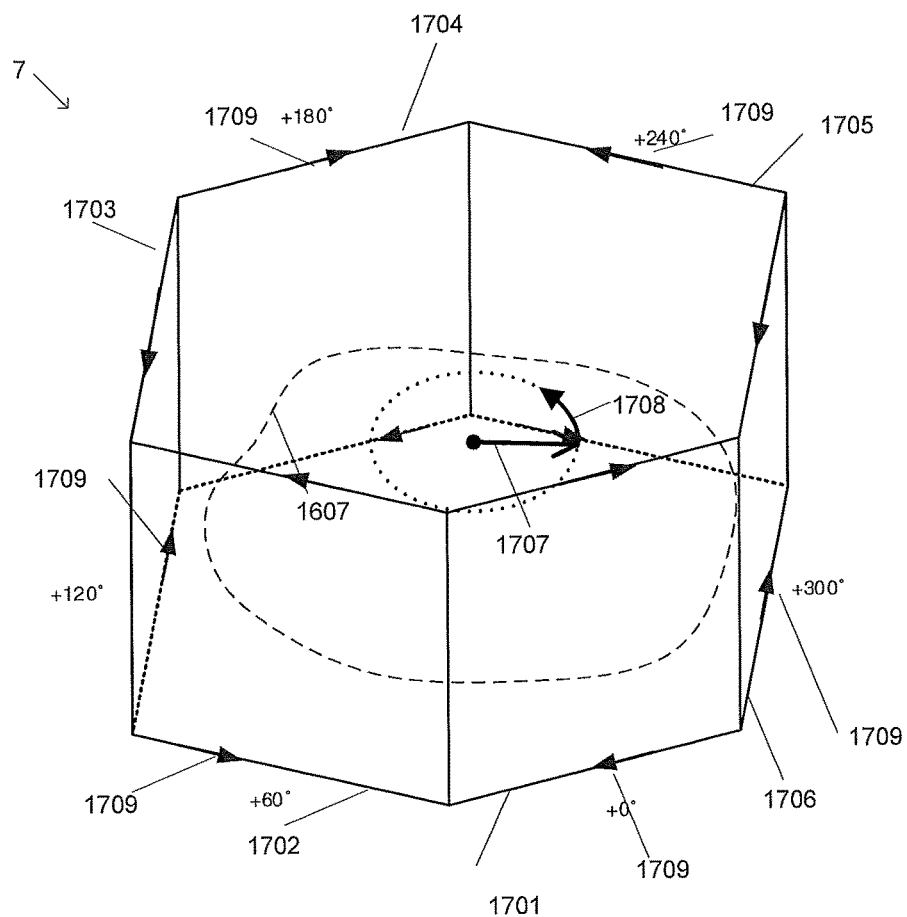
FIG. 17 is a first example of a six coil, three phase charging box transmitter.

FIG. 17 shows a perspective view of a possible coil structure for a charging box transmitter 1601. In this case, the charging box transmitter 1601 has six of transmitting coil 7, each spaced 60° apart, distributed radially around the perimeter of the charging area 1607. These transmitting coils 7 are driven with a phase difference of 60° between each transmitting coil 7 and its two adjacent transmitting coils 7, so that the magnetic field produced by each coil is positively phase shifted when compared with the magnetic field produced by the transmitting coil 7 on one side, and negatively phase shifted when compared with the transmitting coil 7 on the other side. In this example, a first transmitting coil 1701 is driven with 0° of electrical phase delay, then a clockwise adjacent second transmitting coil 1702 is driven with a phase of +60°, i.e., a leading phase relative to the first transmitting coil 1701. The phase delay continues to increase in increments of +60° clockwise around the perimeter of the charging area 1607, from the third transmitting coil 1703, to the fourth transmitting coil 1704, the fifth transmitting coil 1705 and the sixth transmitting coil 1706, the last of which has +300° phase relative to the first transmitting coil 1701. Current measurement direction indicators 1709 are provided, to which the phases of each transmitting coil 7 can be added in order to determine the current direction at any given instant. A rotating magnetic field vector 1707 is shown alongside an arrow 1708 to indicate the direction of rotation of the magnetic field vector 1707.

The transmitting coils 7 in FIG. 17 are arranged to form approximately opposing wire loops, for example, the first transmitting coil 1701 and the fourth transmitting coil 1704. Because the transmitting coils 7 on opposing sides of the charging box transmitter 1601 are driven 180° out of phase, a magnetic field is created which may extend right across the charging area 1607. This field can then complete the magnetic circuit by travelling back through ferrite (not shown) which can be placed anywhere in and around the charging box transmitter 1601, such as around the transmitting coils 7, on the outer side of the transmitting coils 7, between adjacent transmitting coils 7, underneath the base of the charging area 1607. Ferrite can also be used as shielding around any electronics, any metal which might be prone to eddy currents or around other sensitive parts. Because the transmitting coils 7 are driven out of phase from adjacent transmitting coils 7, a rotating magnetic field is created in the charging area 1607.

Figure 18:
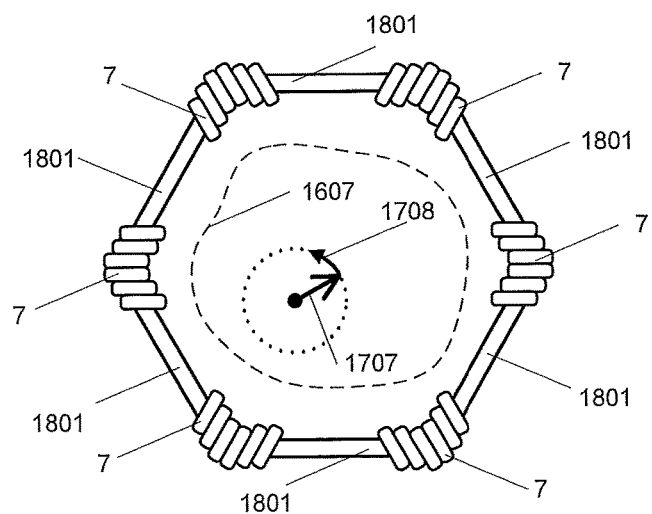
FIG. 18 is a second example of a six coil, three phase charging box transmitter.

FIG. 18 shows a plan view of another possible magnetic structure for a charging box transmitter 1601. Six of transmitting coil 7 are wound around a ferrite structure 1801, so that the axis that each transmitting coil 7 is wound around is tangential to the perimeter of the charging area 1607. In one operating mode of this design, the magnetic flux from transmitting coils 7 on opposing sides of the ferrite structure 1801 will meet at a point in the ferrite structure 1801 and jump across the charging area 1607 to the ferrite structure 1801 on the other side, whereupon the flux lines will diverge and flow back through the coils from which they originated, completing the magnetic circuit. As in FIG. 17, the phase of the magnetic field produced by each transmitting coil 7 is 60° leading compared to the magnetic field of the transmitting coil 7 on its immediate right, so that the magnetic field lines which jump across the charging area 1607 will rotate counter clockwise. A magnetic field vector 1707 and motion arrow 1708 to indicate the direction of rotation of the magnetic field vector 1707 is also shown. It is possible, in a single charging box transmitter 1601 to have a combination of transmitting coils 7 that have axes tangential to and radial from the charging area 1607.

There are many possible modes of operation for a moving magnetic field charging box transmitter 1601. For example, in the case where there are six transmitting coils 7, instead of an electrical phase difference of 60° between adjacent transmitting coils 7, a higher phase difference such as 120° or 180° is possible. This will cause the generated magnetic field to take a different path and reach different areas of the charging area 1607.

Any number of transmitting coils 7 and electrical phases may be used to generate the magnetic field. For example, five of transmitting coil 7 may be used, in which case the phase angle between be each adjacent coil may be 72°. It is generally preferable that symmetry is maintained between the phases, so that each phase has the same number of coils powered from it. For example, it would generally be less effective to have two transmitting coils 7 powered by phase-1 and only one powered by phase-2. Therefore, in the example given here with five transmitting coils 7, five electrical phases would be required to maintain symmetry. This may require a five phase inverter.

For simplicity, it may be preferable that the electrical phase angle between transmitting coils 7 matches the physical angle between transmitting coils 7, however this is not required in order to create a moving magnetic field. While odd numbers of transmitting coils 7 are possible, even numbers are preferred because, in cases where the phase difference between a pair of transmitting coils 7 is to be 180°, it is possible to connect the transmitting coils 7 in series and drive them from a single phase, but with the wiring polarity of one transmitting coils 7 reversed to maintain the 180° phase relationship. This may result in fewer inverters being required to drive the transmitting coils 7.

Figure 19:
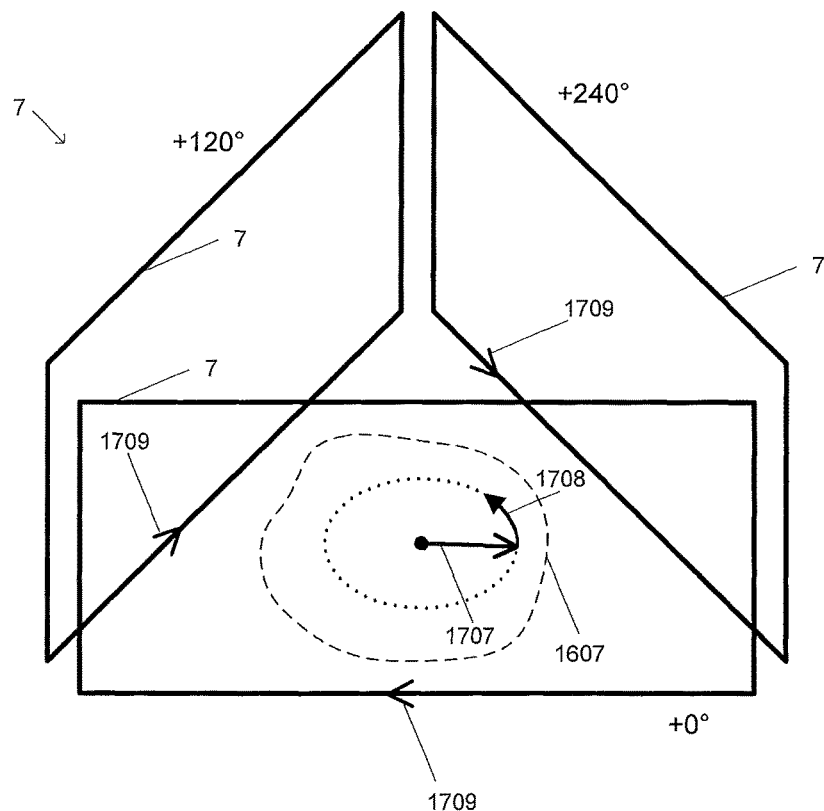
FIG. 19 is an example of a three coil, three phase charging box transmitter.

An example of using an odd number of transmitting coils 7 is shown in FIG. 19, where three transmitting coils 7 are used. These three transmitting coils 7 are oriented 120° apart and arranged around the charging area 1607. The transmitting coils 7 are driven by a total of three phases, with each phase 120° electrically apart from the other two phases, so that the electrical phase of each transmitting coil 7 lags the phase of the transmitting coil 7 to the left side, when viewed from above. In this way, a rotating magnetic field vector 1707 is created in the charging area 1607. The direction of motion of the rotating magnetic field vector 1707 is indicated by arrow 1708.

In some implementations of the charging box transmitter 1601, it may be advantageous to operate two, three or more non-adjacent transmitting coils 7 in phase with each other. For example, transmitting coils 7 can be connected in series, or alternately the phase relationship between the coils can be modified by the inverter 6. The flux pattern in the charging area 1607 varies depending on the number of transmitting coils 7 which are in phase with each other.

It is possible to overlap the windings of nearby transmitting coils 7 in order to better contain the magnetic flux within any ferrite material and in order to generate a smoother magnetic field in the charging area 1607. It is possible to overlap the windings of transmitting coils 7 when they are in the form of wire loops with axes arranged radially around the charging area 1607 as shown in FIG. 17, and also when they are in the form of windings tangential to the charging area 1607, as shown in FIG. 18. Increasing the number of electrical phases or decreasing the phase difference between adjacent coils can also help to create a smoother magnetic field in the charging area 1607.

Because the inductive coupling structures shown in FIGS. 17 and 18 involve several smaller transmitting coils 7 rather than one large transmitting coil 7 as is typically the case in charging box style inductive power transmitters 2, the voltages required to drive the several smaller transmitting coils 7 may be lower than the voltages required to drive the single large transmitting coil 7 of a typical charging box inductive power transmitter 2. Further, because the inductive coupling structures typically inherently result in mutual inductance between adjacent transmitting coils 7 and because a phase offset between adjacent transmitting coils 7 is in this case desired, the autonomous inverter is particularly suitable for driving charging box style inductive power transmitters 2 which use a rotating magnetic field.

While the autonomous inverter described herein is particularly suitable for driving a charging box transmitter 1601 with a moving magnetic field, a range of other inverter types can also be used. For example, individual single phase inverters may be used in combination to form inverter 6, with a separate single phase inverter used to drive each phase. These single phase inverters can be synchronized with each other so that the desired phase relationship between the outputs of each single phase inverter is achieved. Single phase inverters suitable for this purpose include half bridge inverters, full bridge inverters and push-pull inverters. The number of available electrical phases can then be increased by adding additional single phase inverters.

Figure 20:
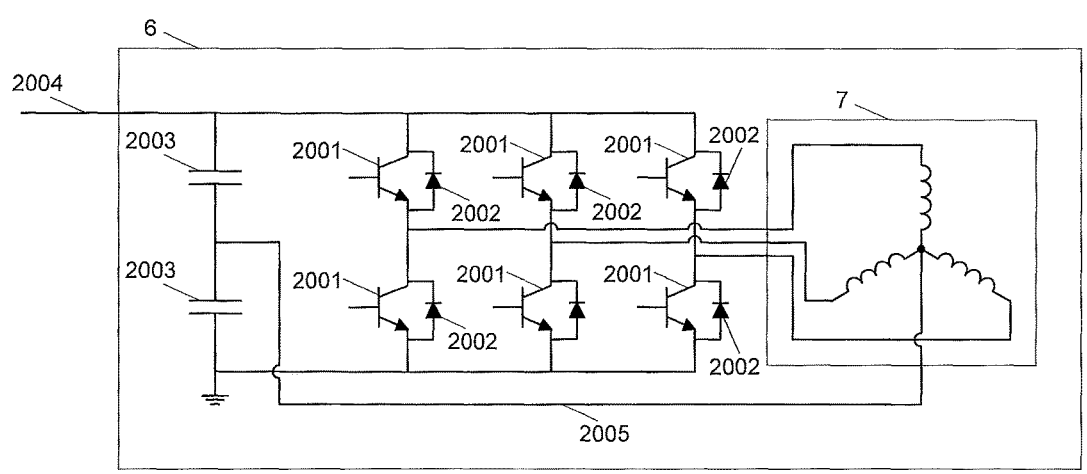
FIG. 20 is a circuit diagram of a three phase inverter.

A further inverter type suitable for driving a charging box transmitter 1601 that has a moving magnetic field is a polyphase half bridge inverter, as shown in FIG. 20. In this simplified example, a three-phase half-bridge inverter is constructed from transistors 2001, diodes 2002 and capacitors 2003. A DC voltage 2004 powers the inverter 6. The outputs of the inverter 6 are connected to transmitting coils 7 which are arranged in a "wye" configuration, though a "delta" configuration is also possible. An optional neutral connection 2005 is also shown connected to the centre of the "wye" connection. Though they are not shown, series and/or parallel capacitive tuning can be used on any of the transmitting coils 7. The number of inverter phases can be increased from the three phases shown by adding additional transistor pairs and connections to transmitting coils 7. Each of the transmitting coils 7 shown in FIG. 20 represents a single phase and may therefore comprise one, two or more separate physical coils.

With some inverter types mutual inductances between transmitting coils 7 of different phases may increase power losses within the inverter 6 or may cause the inverter 6 to function incorrectly. Mutual inductance between different transmitting coils 7 is typical in a charging box transmitter 1601. Mutual inductance may not be a problem when using the autonomous inverter described herein, which benefits from some mutual coupling between the phases. However, with some inverter types, it may be desirable to reduce the mutual magnetic coupling between phases so that the interaction between the inverters is minimized. This can be achieved using a magnetic balancing structure.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power transmitter comprising:
   a plurality of autonomous resonant inverters, wherein each autonomous resonant inverter outputs a voltage to at least one respective transmitter coil for inductive power transfer; and
   a magnetic coupling structure between the respective transmitter coils, wherein the magnetic coupling structure is configured to determine a phase shift between the output voltages of the autonomous resonant inverters;
   wherein the magnetic coupling structure comprises a common magnetic core for the transmitter coils.

2. The inductive power transmitter of claim 1,
   wherein a magnetic coupling between the respective transmitter coils is substantially symmetrical, or
   wherein mutual inductances between the respective transmitter coils are within 15% of each other.

3. The inductive power transmitter of claim 1,
   wherein the magnetic coupling structure comprises a magnetic balancing structure configured to adjust magnetic coupling between the respective transmitter coils.

4. The inductive power transmitter of claim 1 wherein the plurality of autonomous resonant inverters are configured for substantially zero voltage switching.

5. The inductive power transmitter of claim 1 wherein the plurality of autonomous resonant inverters are connected in a ring topology.

6. The inductive power transmitter of claim 1,
   wherein a coupling coefficient is at least 0.01, or
   wherein the coupling coefficient is between 0.2 and 0.3, or
   wherein the transmitter is configured for travelling wave mode.

7. The inductive power transmitter of claim 1,
   wherein a coupling coefficient (k) between the respective transmitter coils is 0.0001 or wherein the coupling coefficient (k) is between $0<k<<0.001$, or wherein the transmitter is configured for in-phase mode.

8. The inductive power transmitter of claim 1 configured as a poly-phase contactless slipring system.

9. The inductive power transmitter of claim 1, wherein the plurality of autonomous resonant inverters are each autonomous current fed push pull resonant inverters, or wherein each autonomous resonant inverter comprises:
- a DC power supply configured to supply power to a first branch and a second branch;
- a transmitter coil connected between a first node on the first branch and a second node on the second branch;
- a first switch, configured to be switched by a first switching signal, connected between the first node and a common ground; and
- a second switch, configured to be switched by a second switching signal, connected between the second node and the common ground,
- wherein the first switching signal is based upon the second node when the second node is low and based upon a DC source when the second node is high, and the second switching signal based upon the first node when the first node is low and based upon a DC source when the first node is high.

10. The inductive power transmitter of claim 9, wherein the transmitter coil is connected in parallel with a resonant capacitor.

11. The inductive power transmitter of claim 9, wherein a first gate of the first switch is connected to the second node by a first diode, and wherein a second gate of the second switch is connected to the first node by a second diode.

12. The inductive power transmitter of claim 11, wherein a first capacitor is connected in parallel with the first diode and a second capacitor is connected in parallel with the second diode.

13. The inductive power transmitter of claim 9, wherein the DC source is connected to a DC power supply via a current limiting resistor.

14. An inductive power transmitter comprising:
- three transmitter coils;
- a plurality of autonomous resonant inverters having at least three outputs of different phases, each output being configured to connect to one or more of the transmitter coils; and
- a common magnetic core for the transmitter coils configured to determine a phase shift between the output voltages of the autonomous resonant inverters,
- wherein the transmitter coils and the phases are configured provide a time varying or spatially varying magnetic field in a charging volume.

15. The inductive power transmitter of claim 14, wherein each of the transmitter coils has an axis that passes through the centre of the charging volume, or wherein the phases are equally spaced.

16. The inductive power transmitter of claim 14, wherein the plurality of autonomous resonant inverters are connected in a ring topology, or wherein the plurality of autonomous resonant inverters are each autonomous current fed push pull resonant inverters.

17. The inductive power transmitter of claim 16 further comprising a magnetic balancing structure configured to adjust the magnetic coupling between transmitter coils.

18. The inductive power transmitter of claim 17 wherein the mutual inductances between each transmitter coil and its adjacent transmitter coils are within 15% of each other.

19. The inductive power transmitter of claim 14 wherein at least two of the transmitter coils are connected substantially in series.

20. The inductive power transmitter of claim 14 wherein the transmitter coils are an even number of transmitter coils, or wherein the transmitter coils are six transmitter coils.

* * * * *